United States Patent

Hyodo

[11] Patent Number: 5,929,575
[45] Date of Patent: Jul. 27, 1999

[54] MOTOR CONTROL DEVICE CONTROLLING INTENDED SPEED RATIO AND POSITIONAL RELATIONSHIP BETWEEN DRIVEN OBJECTS

[75] Inventor: Haruhiro Hyodo, Toyohashi, Japan

[73] Assignee: Minolta Co., Ltd., Osaka, Japan

[21] Appl. No.: 08/840,591

[22] Filed: Apr. 1, 1997

[30] Foreign Application Priority Data

Apr. 2, 1996 [JP] Japan .................................. 8-079835

[51] Int. Cl.⁶ .......................................................... H02P 5/46
[52] U.S. Cl. .............................................................. 318/69
[58] Field of Search .......................................... 318/68–85

[56] References Cited

U.S. PATENT DOCUMENTS

| | | | |
|---|---|---|---|
| 3,351,831 | 11/1967 | Hemphill et al. | 318/77 |
| 3,575,647 | 4/1971 | Levy | 318/8 |
| 3,598,489 | 8/1971 | Thomas et al. | 355/51 |
| 4,051,415 | 9/1977 | Martin | 318/7 |
| 4,436,416 | 3/1984 | Negoro et al. | 355/57 |
| 4,656,577 | 4/1987 | Herman | 364/167.01 |
| 4,686,434 | 8/1987 | Kojima et al. | 318/52 |
| 4,761,597 | 8/1988 | Sasaki et al. | 318/625 |
| 4,906,908 | 3/1990 | Papiernik et al. | 318/600 |
| 5,083,074 | 1/1992 | Suzuki et al. . | |
| 5,159,503 | 10/1992 | Mitamura et al. | 360/73.02 |
| 5,231,335 | 7/1993 | Mega et al. | 318/85 |
| 5,278,477 | 1/1994 | Hartmann et al. | 318/112 |
| 5,434,486 | 7/1995 | Tanaka | 318/69 |

FOREIGN PATENT DOCUMENTS

| | | |
|---|---|---|
| 57-52365 | 3/1982 | Japan . |
| 57-211171 | 12/1982 | Japan . |
| 57-211172 | 12/1982 | Japan . |
| 58-7161 | 1/1983 | Japan . |
| 59-6767 | 1/1984 | Japan . |
| 2-58016 | 2/1990 | Japan . |
| 2-307385 | 12/1990 | Japan . |
| 7-181601 | 7/1995 | Japan . |

Primary Examiner—Jonathan Salata
Attorney, Agent, or Firm—McDermott, Will & Emery

[57] ABSTRACT

According to a motor control device, an operation of one of multiple motors is feedback-controlled based on a target speed signal corresponding to a predetermined target travel speed of a driven object driven by the one motor, or based on the target speed signal and a target position signal corresponding to a target travel position of the driven object related to the one motor. Based on operation information (current travel speed and/or current position) of the driven object driven by the one motor, other motor is feedback-controlled in accordance with a target travel speed and/or a target travel position of a driven object driven by the other motor with respect to the operation information. Thereby, the operation of the other motor is controlled to follow a possible operation variation (speed variations of the motor and the driven object, and/or a position variation of the driven object driven by the motor) related to the one motor. In this manner, an intended speed ratio and/or an intended positional relationship between the driven objects are precisely kept.

12 Claims, 7 Drawing Sheets

MOTOR CONTROL DEVICE CONTROLLING INTENDED SPEED RATIO AND POSITIONAL RELATIONSHIP BETWEEN DRIVEN OBJECTS

BACKGROUND OF THE INVENTION

1. Field of the Invention

The present invention relates to a motor control device for controlling operations of motors which are provided for driving a plurality of driven objects or units, respectively.

2. Description of the Background Art

A plurality of motors are often employed for driving a plurality of driven objects, i.e., objects to be driven in various fields. For example, an image reading apparatus arranged in a copying machine, image scanner or the like is provided with first and second carriages which are reciprocated in a secondary scanning (subscanning) direction for optically scanning an image on an original document laid on an original document table. The first carriage carries components such as a light source for illuminating the original image, and a reflector mirror for reflecting, toward the second carriage, the reflected light beams coming from the original image. The second carriage carries a reflector mirror for reflecting, in a predetermined direction, the image light beams coming from the first carriage.

In some of conventional apparatuses, a single motor is used for driving both the carriages. In this structure, a driving force is transmitted from the single motor to the first and second carriages via appropriate transmission devices such as belt or wire transmission devices for moving both the carriages at an intended speed ratio. In the driving operation for driving both the carriages by such transmission devices, an error is prone to occur at a light path length from the document surface to a focus position, for example, due to an error in assembly of the transmission devices, and/or extension of retained wires for transmission in the transmission devices. When the error once occurs, correction is difficult. Since the single motor drives both the carries, it operates under a heavy load, so that the carriages cannot be driven at a high speed (i.e., image cannot be scanned fast), and other problems may also occur. In view of this, such a structure have been proposed that employs a plurality of linear motors or rotary motors for independently driving the corresponding carriages, respectively.

In either of the foregoing structures, the second carriage is usually driven at half a speed of the first carriage during image scanning.

In the case where both the carriages are driven by the independent motors, respectively, however, variations in travel speed, travel distance and others occur due to independent driving itself as well as independent and synchronous driving of both the carriages under different loads. Therefore, it is difficult to ensure an intended speed ratio between the carriages as well as an intended positional relationship. This causes errors in focusing and others, so that it is difficult to perform precise image scanning and image reading.

Japanese Laid-Open Patent Publication No. 2-307385 (307385/1990) has taught a PLL speed control circuit for controlling and driving, at an intended speed ratio, two linear motors provided for two objects to be controlled, respectively. In this circuit, one reference pulse signal for controlling and driving the linear motors is divided (i.e., frequency-divided) to produce reference signals which are used for the two linear motors to drive them at the intended speed ratio and thereby control the speeds of both the motors based on these reference signals, respectively.

Japanese Laid-Open Patent Publication No. 58-7161 (7161/1983) has taught such a technique that two carriages in an image reading apparatus are driven by different pulse motors, respectively. These pulse motors are driven by the same control signal, and mechanical means is employed for attaining appropriate speed-reduction ratios and thereby attaining an intended speed ratio between the carriages.

Japanese Laid-Open Patent Publication No. 57-211171 (211171/1982) has taught such a technique that two carriages in an image reading apparatus are driven by different pulse motors in different driving manners, respectively. The different driving manners are achieved by employing different energizing manners for the pulse motors, respectively. A difference in step angle is utilized to attain the intended speed ratio between both the motors and therefore the intended speed ratio between both the carriages.

In the speed control circuit taught by the above Japanese Laid-Open Patent Publication No. 2-307385 (307385/1990), however, two controlled objects, i.e., objects to be controlled (e.g., two carriages in an image reading apparatus) are driven by different linear motors, respectively, and each linear motor is driven based on a reference signal produced independently of the other. Therefore, variation in speed occurs in each linear motor independently of the other, and thus variations in travel speed and travel distance occur in each of the controlled objects independently of the other. Therefore, it is difficult to ensure precisely an intended speed ratio and an intended positional relationship between the controlled objects.

In the carriage driving speed control taught by the foregoing Japanese Laid-Open Patent Publication No. 58-7161, the intended speed ratio between the carriages is ultimately attained by the reduction ratio attained by the mechanical means. Therefore, errors are prone to occur in the intended speed ratio and positional relationship between both the carriages due to an original error in the mechanical means itself and an error during use.

According to the manner taught by the foregoing Japanese Laid-Open Patent Publication No. 57-211171, in which two carriages are driven by different pulse motors and in different driving manners, respectively, the motors drive different carriages which applies different loads, respectively. This tends to cause a variation in speed of each motor, and therefore variations in the travel speed and distance of each carriage independently of the other. Therefore, it is difficult to ensure precisely the intended speed ratio and positional relationship between the carriages.

SUMMARY OF THE INVENTION

Accordingly, it is an object of the invention to provide a motor control device for controlling operations of motors which are provided for driving a plurality of driven objects, i.e., objects to be driven, respectively, and more specifically a motor control device which can control easily and precisely the operations of the respective motors so as to maintain precisely an intended speed ratio between the objects to be driven.

Another object of the invention is to provide a motor control device for controlling operations of motors which are provided for driving a plurality of driven objects, respectively, and more specifically a motor control device which can control easily and precisely the operations of the respective motors so as to maintain precisely an intended speed ratio and an intended positional relationship between the objects to be driven.

The invention provides a motor control device, wherein feedback control of an operation of one of a plurality of motors is performed based on a target speed signal corresponding to a predetermined target travel speed of a driven object to be driven by the above one motor, or based on the target speed signal and a target position signal corresponding to a target travel position of the driven object of the above one motor. Further, feedback control of the motor other than the above one motor is performed based on operation information (current travel speed and/or current position) of the driven object driven by the above one motor and in accordance with either or both of the target travel speed and target travel position of the driven object driven by the motor other than the one motor with respect to the operation information. Thereby, even when an operation variation (speed variation of the one motor and the driven object, and/or the position variation of the driven object driven by the one motor) occurs in connection with the one motor, the operation of the motor other than the one motor is controlled in view of the variation, so that intended speed ratio and/or positional relationship between the plurality of driven objects are precisely ensured.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
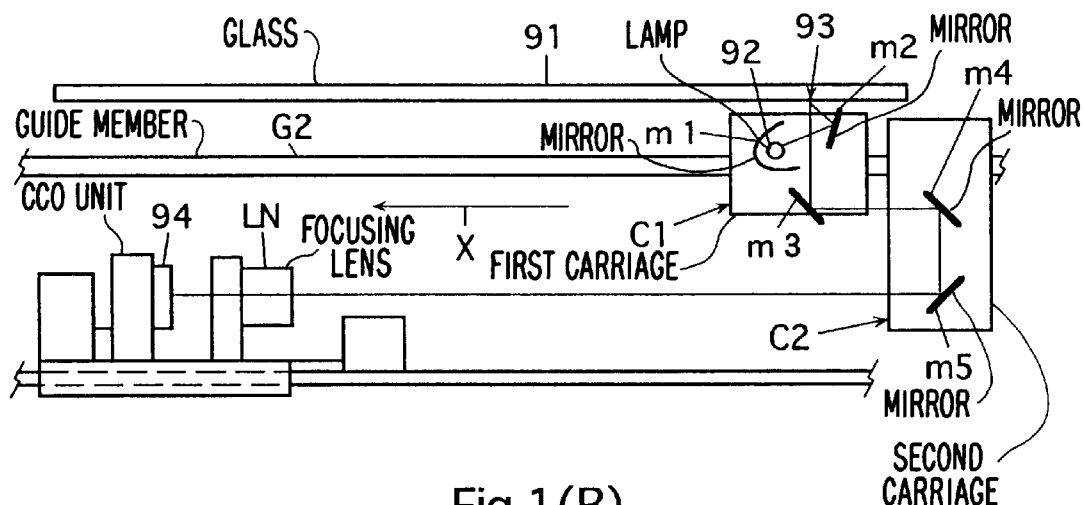
FIG. 1(A) is a schematic side view of an image reading apparatus employing linear motors provided for carriage driving and controlled by a motor control device of the invention.

The following three types of motor control devices [1], [2] and [3] are typical examples of the motor control devices of the invention:

[1] A motor control device for controlling operations of a plurality of motors provided for a plurality of driven objects for driving the driven objects, respectively, including:

means for outputting a target speed signal corresponding to a target travel speed of the driven object driven by one of said motors;

means for performing feedback control of the operation of said one motor to attain the target travel speed of the driven object driven by said one motor based on the target speed signal issued from said target speed signal output means;

means for outputting a target speed signal corresponding to an intended target travel speed of the driven object driven by the motor other than said one motor based on a current travel speed of the driven object driven by said one motor with respect to said above current travel speed; and means for performing feedback control of the operation of said other motor for said other object to attain the target travel speed of said other driven object based on the target speed signal sent from said target speed signal output means corresponding to said other driven object.

According to this motor control device, said one motor is feedback-controlled by the corresponding feedback control means to drive the corresponding driven object at the target travel speed based on the target speed signal sent from said target speed signal output means.

Said other motor is feedback-controlled by said feedback control means provided for the same to drive the corresponding driven object at its target travel speed based on the target speed signal sent from said target speed signal output means corresponding to the other driven object driven by the other motor. Since the target speed signal issued for the other motor corresponds to the predetermined target travel speed related to the current travel speed of the driven object driven by said one motor, the drive speed of the other motor and the travel speed of the driven object related to the other motor can be maintained at intended values relatively the driving speed of the one motor and the travel speed of the driven object related to the one motor.

The predetermined target travel speed of the driven object relative to the current travel speed of the driven object driven by the one motor is, typically, a target travel speed corresponding to the predetermined drive speed ratio of the other driven object relative to the current travel speed.

The target speed signal outputted from the target speed signal output means for the driven object driven by the one motor may be a constant target speed signal for driving of the driven object at a constant speed. In order to increase and/or decrease its travel speed when it is in a range outside a range for constant-speed driving, motor control means for increasing/decreasing the speed may be provided. In this case, at least a portion of the motor control means for the increasing/decreasing the drive speed, i.e., for speed-change driving may be formed of a component(s) of the motor control device [1] according to the invention described above.

However, when the driven object is to be driven, for example such that it advances from a home position to a first position at an increasing speed, advances from the first position to a second position at a constant speed, and then returns to the home position, the following structure may be employed.

The motor control device of the above item [1] is provided with switching means for switching the target speed signal outputted from the target speed signal output means for the driven object driven by said one motor between a first speed-change target speed signal for advancing and accelerating the driven object from the home position to the first position, a constant speed target speed signal for constant speed advance from the first position to the second position, and a second speed-change target speed signal for return from the second position to the home position.

Thereby, each of the motors is controlled to drive the corresponding driven object selectively at changing and constant speed selected by this switching means. According to this structure, the changing speed control and the constant speed control can be performed by the single motor control device.

[2] A motor control device for controlling operations of a plurality of motors provided for a plurality of driven objects for driving the driven objects, respectively, including:

means for outputting a target speed signal corresponding to a target travel speed of the driven object driven by one of said motors;

means for outputting a target position signal corresponding to a target travel position of the driven object driven by said one motor;

means for performing feedback control of the operation of said one motor to attain the target travel speed and the target travel position of the driven object driven by said one motor based on the target speed signal issued from said target speed signal output means and the target position signal issued from said target position signal output means;

means for outputting a target speed signal corresponding to an intended target travel speed of the driven object driven by the motor other than said one motor based on a current travel speed of the driven object driven by said one motor with respect to said above current travel speed;

means for outputting a target position signal corresponding to an intended target travel position of the driven object driven by the motor other than said one motor based on a current position of the driven object driven by said one motor with respect to said above current position; and means for performing feedback control of the operation of said other motor for said other object to attain the target travel speed and the target travel position of said other driven object based on the target speed signal issued from said target speed signal output means corresponding to said other driven object and said target position signal issued from said target position signal output means corresponding to said other driven object.

According to this motor control device, said one motor is feedback-controlled by the corresponding feedback control means to drive the corresponding driven object at the target travel speed to the target travel position (target travel distance) based on the target speed signal issued from said target speed signal output means corresponding to the driven object driven by said one motor and the target position signal issued from said target position signal output means corresponding to the driven object driven by said one motor.

Said other motor is feedback-controlled by said feedback control means provided for the same to drive the corresponding driven object at its target travel speed toward the target travel position based on the target speed signal sent from said target speed signal output means corresponding to the other driven object driven by the other motor and the target position signal sent from said target position signal output means corresponding to the other driven object driven by the other motor. Since the target speed signal and the target position signal issued for the other motor correspond to the predetermined target travel speed and the target position (target travel distance) related to the current travel speed and the current position of the driven object driven by said one motor, the drive speed of the other motor as well as the travel speed and the current position of the driven object related to the other motor can be maintained at intended values relatively the driving speed of the one motor as well as the travel speed and the current position of the driven object related to the one motor.

The predetermined target travel speed of the other driven object relative to the current travel speed of the driven object driven by the one motor is, typically, a target travel speed corresponding to the predetermined drive speed ratio of the other driven object relative to the current travel speed.

The predetermined target travel position of the other driven object relative to the current travel position of the driven object driven by the one motor is, typically, a target travel position corresponding to the predetermined travel distance ratio of the other driven object relative to the current position.

Similarly to the former case, the target speed signal outputted from the target speed signal output means for the driven object driven by the one motor may be a constant target speed signal for driving of the driven object at a constant speed. In order to increase and/or decrease its travel speed when it is in a range outside a range for constant-speed driving, motor control means for increasing/decreasing the speed may be provided. In this case, at least a portion of the motor control means for the increasing/decreasing the drive speed, i.e., for speed-change driving may be formed of a component(s) of the motor control device [2] according to the invention described above.

However, when the driven object is to be driven, for example such that it advances from a home position to a first position at an increasing speed, advances from the first position to a second position at a constant speed, and then returns to the home position, the following structure may be employed.

The motor control device of the above item [2] is provided with switching means for successively switching the target position signal outputted from the target position signal output means for the driven object driven by said one motor between position signals for the first position, the second position and the home position, and switching means for switching the target speed signal outputted from the target speed signal output means for the driven object driven by said one motor between a first speed-change target speed signal for advancing and accelerating the driven object from the home position to the first position, a constant-speed target speed signal for constant speed advance from the first position to the second position, and a second speed-change target speed signal for return from the second position to the home position.

Thereby, each of the motors is controlled to drive the corresponding driven object selectively at changing and constant speed selected by this switching means. According to this structure, the changing speed control and the constant speed control can be performed by the single motor control 378 device.

[3] A motor control device for controlling operations of a plurality of motors provided for a plurality of driven objects for driving the driven objects, respectively, including:

means for outputting a target speed signal corresponding to a target travel speed of the driven object driven by one of said motors;

means for performing feedback control of the operation of said one motor to attain the target travel speed of the driven object driven by said one motor based on the target speed signal issued from said target speed signal output means;

means for outputting a target position signal corresponding to an intended target travel position of the driven object driven by the motor other than said one motor based on a current position of the driven object driven by said one motor with respect to said above current position; and means for performing feedback control of the operation of said other motor for said other object to attain the target travel position of said other driven object based on the target position signal sent from said target position signal output means corresponding to said other driven object.

According to this motor control device, said one motor is feedback-controlled by the corresponding feedback control means to drive the corresponding driven object at the target travel speed based on the target speed signal issued from said target speed signal output means corresponding the driven object driven by said one motor.

Said other motor is feedback-controlled by said feedback control means provided for the same to drive the corresponding driven object toward the target travel position based on the target position signal sent from said target position signal output means corresponding to the other driven object driven by the other motor. Since the target position signal issued for the other motor corresponds to the predetermined target travel position (target travel distance) related to the current position of the driven object driven by said one motor, the current position of the driven object related to the other motor can maintain a predetermined relationship with respect to the current position of the driven object related to the one motor.

The predetermined target travel position of the other driven object relative to the current travel position of the driven object driven by the one motor may be a target travel position corresponding to the predetermined travel distance ratio of the other driven object relative to the current position.

Similarly to the former case, the target speed signal outputted from the target speed signal output means for the driven object driven by the one motor may be a constant target speed signal for driving of the driven object at a constant speed. In order to increase and/or decrease its travel speed when it is in a range outside a range for constant-speed driving, motor control means for increasing/decreasing the speed may be provided. In this case, at least a portion of the motor control means for the increasing/decreasing the drive speed, i.e., for speed-change driving may be formed of a component(s) of the motor control device [3] according to the invention described above.

However, when the driven object is to be driven, for example such that it advances from a home position to a first position at an increasing speed, advances from the first position to a second position at a constant speed, and then returns to the home position, the following structure may be employed.

The motor control device of the above item [3] is provided with switching means for switching the target speed signal outputted from the target speed signal output means for the driven object driven by said one motor between a first speed-change target speed signal for advancing and accelerating the driven object from the home position to the first position, a constant-speed target speed signal for constant speed advance from the first position to the second position, and a second speed-change target speed signal for return from the second position to the home position.

Thereby, each of the motors is controlled to drive the corresponding driven object selectively at changing and constant speed selected by this switching means. According to this motor control device, the changing speed control and the constant speed control can be performed by the single motor control device.

The motors in the above motor control devices [1]–[3] may be rotary motors or linear motors.

The plurality of the driven objects in each of the above motor control devices [1]–[3] may be first and second carriages which are reciprocated in a subscanning direction (secondary scanning direction) for optically scanning an image on an original document laid on a document table in an image reading device of a copying machine, image scanner or the like. The first carriage carries a light source for illuminating the original image, a reflector mirror (first reflector member) for leading, toward the second carriage, the reflected light beams coming from the original image and others. The second carriage carries a reflector mirror (second reflector member) for leading, in a predetermined direction (e.g., toward a focus position of a focusing lens), the image light beams coming from the first carriage. The first and second carriages are driven in the subscanning direction from their home positions, respectively. They are accelerated to predetermined target speeds depending on a read magnification and others before arrival at image reading start positions. From the image reading start position, each carriage is driven at a constant speed to an image reading finish position so as to keep a constant light path length from the original surface to the focusing portion (e.g., focusing lens) and thereby perform good image reading without an image distortion. When reading of the original is finished, each carriage is driven at a reduced speed and thereafter driven reversely in the subscanning direction, and returns to the home position. During image reading, a ratio of travel distance between the first and second carriages is kept at 2:1, or a ratio of drive speed between the first and second carriages is kept at 2:1, so that the light path length can be kept constant.

When the driven objects to be controlled are two in number as described above, the control of driving can be performed by one of the following three types of motor control devices (1)–(3).

(1) A motor control device for controlling operations of first and second motors provided with encoders and operable to drive first and second driven objects, respectively, including:

first speed detecting means for detecting a travel speed of said first driven object based on an encoder output signal of said first motor, and issuing a current travel speed signal;

first target speed signal output means for outputting a target speed signal corresponding to a target travel speed of said first driven object;

first speed difference detecting means for making a comparison between the target speed signal issued from said first target speed signal output means and the travel speed signal issued from said first speed detecting means, and outputting a speed difference signal corresponding to the difference detected by the comparison;

first motor drive means for driving said first motor so as to correct said speed difference based on the speed difference signal sent from said first speed difference detecting means;

second speed detecting means for detecting a travel speed of said second driven object based on an encoder output signal of said second motor, and outputting a current travel speed signal;

second target speed signal output means for outputting a target speed signal corresponding to a target travel speed of said second driven object corresponding to a predetermined drive speed ratio between said first and second driven objects based on the encoder output signal of said first motor;

second speed difference detecting means for making a comparison between the target speed signal issued from said second target speed signal output means and the travel speed signal issued from said second speed detecting means, and outputting a speed difference signal corresponding to the speed difference detected by the comparison; and second motor drive means for driving said second motor so as to correct the speed difference based on the speed difference signal sent from said second speed difference detecting means.

According to this motor control device, the first speed detecting means detects the current travel speed of the first driven object based on the encoder output signal of the first motor. The first speed difference detecting means compares this travel speed with the target travel speed issued from the first target speed signal output means, and the first motor drive means performs feedback control of the first motor in accordance with the speed difference. Thereby, the drive speed of the first motor and thus the travel speed of the first driven object can be kept at the target speeds.

The second speed detecting means detects the current travel speed of the second driven object based on the encoder output of the second motor. The second speed difference detecting means compares this travel speed with the target travel speed sent from the second target speed signal output means, and the second motor drive means performs feedback control of the second motor in accordance with the speed difference. Thereby, the drive speed of the second motor and thus the travel speed of the second driven object can be kept at the target speeds. In this operation, the target speed signal issued from the second target speed signal output means depends on the drive speed of the first motor, and in other words, the travel speed of the first driven object and the predetermined drive speed ratio (e.g., of 2:1). Therefore, the speed of the second motor (and thus the speed of the second driven object) can be kept to attain a predetermined drive speed ratio with respect to the speed of the first motor (and thus the first driven object).

(2) A motor control device for controlling operations of first and second motors provided with encoders and operable to drive first and second driven objects, respectively, including:

first speed detecting means for detecting a travel speed of said first driven object based on an encoder output signal of said first motor, and issuing a current travel speed signal;

first position detecting means for detecting a current position of said first driven object based on an encoder output signal of said first motor, and issuing a current travel position signal;

first target speed signal output means for outputting a target speed signal corresponding to a target travel speed of said first driven object;

first target position signal output means for outputting a target position signal corresponding to a target travel position of said first driven object;

first speed difference detecting means for making a comparison between the target speed signal issued from said first target speed signal output means and the travel speed signal issued from said first speed detecting means, and outputting a speed difference signal corresponding to the difference detected by the comparison;

first position difference detecting means for making a comparison between the target position signal issued from said first target position signal output means and the current position signal issued from said first position detecting means, and outputting a position difference signal corresponding to the position difference detected by the comparison;

first motor drive means for driving said first motor so as to correct said speed difference and said position difference based on the speed difference signal sent from said first speed difference detecting means and the position difference signal sent from said first position difference detecting means;

second speed detecting means for detecting a travel speed of said second driven object based on an encoder output signal of said second motor, and outputting a current travel speed signal;

second position detecting means for detecting a current position of said second driven object based on an encoder output signal of said second motor, and outputting a current position signal;

second target speed signal output means for outputting a target speed signal corresponding to a target travel speed of said second driven object corresponding to a predetermined drive speed ratio between said first and second driven objects based on the encoder output signal of said first motor;

second target position signal output means for outputting a target position signal corresponding to a target travel position of said second driven object corresponding to a predetermined travel distance ratio between said first and second driven objects based on the current position signal of said first driven object sent from said first position detecting means;

second speed difference detecting means for making a comparison between the target speed signal issued from said second target speed signal output means and the travel speed signal issued from said second speed detecting means, and outputting a speed difference signal corresponding to the speed difference detected by the comparison;

second position difference detecting means for making a comparison between the target position signal issued from said second target position signal output means and said current position signal issued from said second position detecting means, and outputting a position difference signal corresponding to the position difference detected by the comparison; and second motor drive means for driving said second motor so as to correct the speed difference and the position difference based on the speed difference signal sent from said second speed difference detecting means and the position difference signal sent from said second position difference detecting means.

According to this motor control device, the first speed detecting means and the first position detecting means detect the current travel speed and position of the first driven object. The first speed difference detecting means and the first position difference detecting means compare this travel speed and the current position with the target travel speed and the target travel position issued from the first target speed signal output means and the first target position signal output means, and the first motor drive means performs feedback control of the first motor in accordance with the speed and position differences. Thereby, the drive speed of the first motor and thus the travel speed of the first driven object can be kept at the target speeds, and the travel position (travel distance) of the first driven object can be kept at the target travel position (target travel distance).

The second speed detecting means and the second position detecting means detect the current travel speed and the current position of the second driven object. The second speed difference detecting means and the second position difference detecting means compare this travel speed and the current position with the target travel speed and the target position of the second driven object sent from the second target speed signal output means and the second target position signal output means, and the second motor drive means performs feedback control of the second motor in accordance with the speed difference and the position difference. Thereby, the drive speed of the second motor and thus the travel speed of the second driven object can be kept at the target speeds, and the travel position (travel distance) of the second driven object can be kept at the target travel position (target travel distance). In this operation, the target speed issued from the second target speed signal output means depends on the drive speed of the first motor, and in other words, the travel speed of the first driven object and the predetermined drive speed ratio (e.g., of 2:1), and the target position issued from the second target position signal output means depends on the current position of the first driven object and the predetermined travel distance ratio (e.g., of 2:1). Therefore, the speed of the second motor (and thus the speed of the second driven object) can be kept to attain a predetermined drive speed ratio with respect to the speed of the first motor (and thus the first driven object), and the travel distance of the second driven object can be kept to attain a predetermined travel distance ratio (relative positional relationship) with respect to the travel distance of the first driven object.

The following motor control device may be employed for controlling the respective motors for the two (first and second) carriages arranged in the foregoing image reading apparatus of the copying machine, the image scanner or the like, and more generally for the first and second driven objects to be driven in such a manner that each driven object advances from the home position to the first position at an increasing speed, advances from the first position to the second position at a constant speed, and subsequently returns to the home position.

In the motor control device (2) described above, the first and second driven objects are driven to advance from a home position to a first position at an increasing speed, advance from the first position to a second position at a constant speed, and subsequently return to the home position; said first target speed signal output means is operable to output a constant-speed target speed signal corresponding to a constant target travel speed of said first driven object when the first driven object moved from the home position reaches the first position;

said first target position signal output means is operable to output the target position signal corresponding to said second position when said first driven object moved from said home position reaches said first position; and said motor control device further includes means for controlling operations of said first and second motors such that said first and second driven objects advance from their home positions to the first positions at an increasing speed, and return from the second positions to the home positions.

In this case, at least a portion of the motor control means for driving the driven object from the home position to the first position and from the second position to the home position may be formed of a component(s) of the motor control means for the constant-speed driving.

The following motor control device may be employed. In the motor control device (2) described above, said first and second driven objects are driven to advance from a home position to a first position at an increasing speed, advance from the first position to a second position at a constant speed, and subsequently return to the home position;

said motor control device further includes means for successively switching the target position signal issued from the target position signal output means provided for the first driven object driven by said first motor between position signals indicating the first position, the second position and the home position;

said motor control device further includes means for switching the target speed signal issued from the target speed signal output means provided for the first driven object driven by said first motor between a first speed-change target speed signal for advance at an increasing speed from said home position to said first position, a constant-speed target speed signal for advance at a constant speed from said first position to said second position, and a second speed-change target speed signal for return from said second position to the home position; and each of said motors is controlled to drive the corresponding driven object selectively at variable and constant speeds in accordance with switching of the target speed signal.

According to this motor control device, the variable speed control and the constant speed control can be performed by the single motor control device.

(3) A motor control device for controlling operations of first and second motors provided with encoders and operable to drive first and second driven objects, respectively, including:

speed detecting means for detecting a travel speed of said first driven object based on an encoder output signal of said first motor, and issuing a current travel speed signal;

target speed signal output means for outputting a target speed signal corresponding to a target travel speed of said first driven object;

speed difference detecting means for making a comparison between the target speed signal issued from said target speed signal output means and the travel speed signal issued from said speed detecting means, and outputting a speed difference signal corresponding to the difference detected by the comparison;

first motor drive means for driving said first motor so as to correct said speed difference based on the speed difference signal sent from said speed difference detecting means;

position detecting means for detecting a current position of said second driven object based on an encoder output signal of said second motor, and outputting a current position signal;

target position signal output means for outputting a target position signal corresponding to a target travel position of said second driven object corresponding to a predetermined travel distance ratio between said first and second driven objects based on the encoder output signal of said first motor;

position difference detecting means for making a comparison between said target position signal issued from said target position signal output means and the current position signal issued from said position detecting means, and outputting a position difference signal corresponding to the position difference detected by the comparison; and second motor drive means for driving said second motor so as to correct the position difference based on the position difference signal sent from said position difference detecting means.

According to this motor control device, the speed detecting means detects the current travel speed of the first driven object. The speed difference detecting means compares this travel speed with the target travel speed issued from the target speed signal output means, and the first motor drive means performs feedback control of the first motor in accordance with the speed difference. Thereby, the drive speed of the first motor and thus the travel speed of the first driven object can be kept at the target speeds.

Also, the position detecting means detects the current position of the second driven object. The position difference detecting means compares this current position with the target travel position issued from the target position signal output means, and the second motor drive means performs feedback control of the second motor in accordance with the position difference. Thereby, the travel position (travel distance) of the second driven object can be kept at the target travel position (target travel distance). In this operation, the target travel position issued from the target position signal output means depends on the current position of the first driven object and the predetermined travel distance ratio (e.g., of 2:1). Therefore, the travel distance of the second driven object can be kept to attain a predetermined travel distance ratio (relative positional relationship) with respect to the travel distance of the first driven object.

The following motor control device may be employed for controlling the respective motors for the two (first and second) carriages arranged in the foregoing image reading apparatus of the copying machine, the image scanner or the like, and more generally for the first and second driven objects to be driven in such a manner that each driven object advances from the home position to the first position at an increasing speed, advances from the first position to the second position at a constant speed, and subsequently returns to the home position.

In the motor control device (3) described above, the first and second driven objects are driven to advance from a home position to a first position at an increasing speed, advance from the first position to a second position at a constant speed, and subsequently return to the home position;

said target speed signal output means is operable to output a constant-speed target speed signal corresponding to a constant target travel speed of said first driven object when the first driven object moving from the home position reaches the first position; and said motor control device further includes means for controlling operations of said first and second motors such that said first and second driven objects advance from their home positions to the first positions at an increasing speed, and return from the second positions to the home positions.

In this case, at least a portion of the motor control means for driving the driven object from the home position to the first position and from the second position to the home position may be formed of a component(s) of the motor control means for the constant-speed driving.

The following motor control device may be employed. In the motor control device (3) described above, said first and second driven objects are driven to advance from a home position to a first position at an increasing speed, advance from the first position to a second position at a constant speed, and subsequently return to the home position;

said motor control device further includes means for switching the target speed signal issued from the target speed signal output means provided for the first driven object driven by said first motor between a first speed-change target speed signal for advance at an increasing speed from said home position to said first position, a constant-speed target speed signal for advance at a constant speed from said first position to said second position, and a second speed-change target speed signal for return from said second position to the home position; and each of said motors is controlled to drive the corresponding driven object selectively at variable and constant speeds in accordance with switching of the target speed signal.

According to this motor control device, the variable speed control and the constant speed control can be performed by the single motor control device.

Embodiments of the invention will be described below more in detail with reference to the drawings.

Figure 1B:
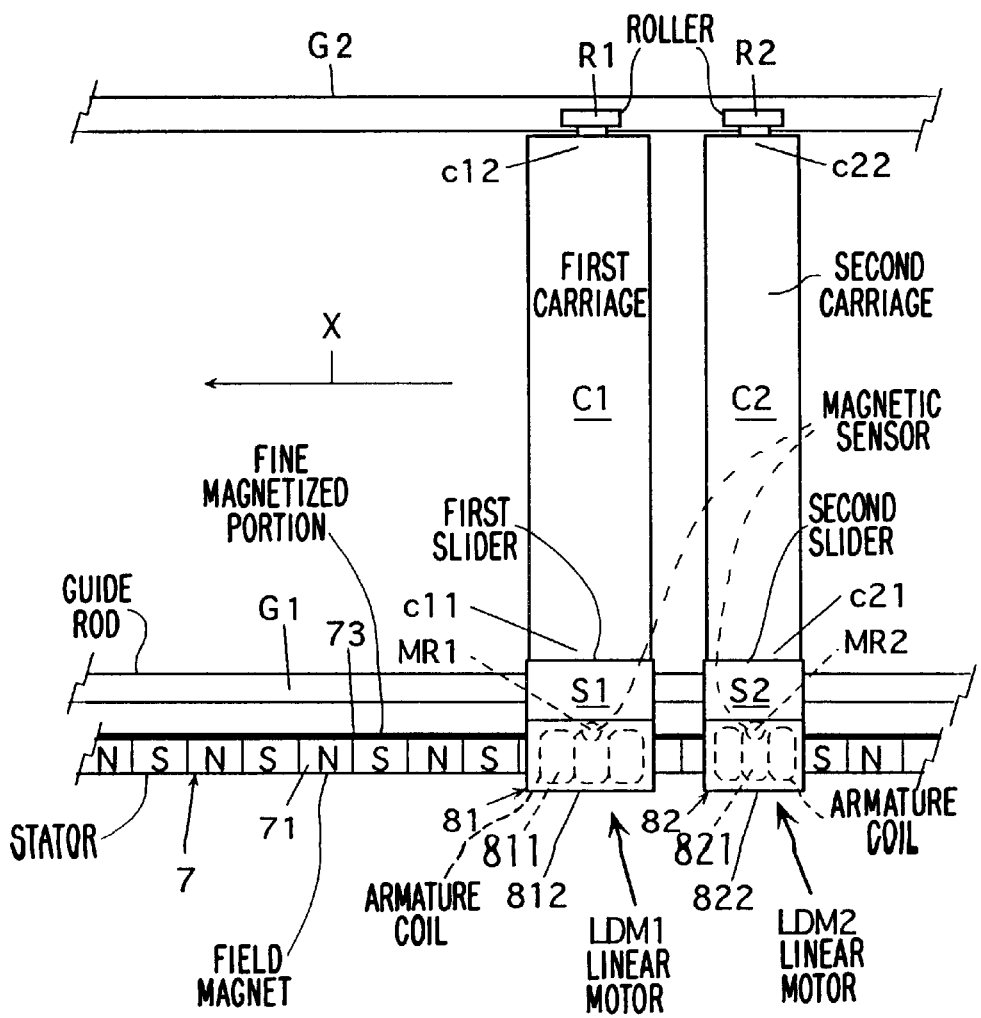
FIG. 1(B) is a schematic plan of the apparatus.

FIGS. 1(A) and 1(B) show an example of objects driven by motors controlled with a motor control device according to the invention, and more specifically show a schematic structure of an image reading apparatus which is provided with two, i.e., first and second carriages and can be utilized in a copying machine, an image scanner or the like. FIG. 1(A) is a schematic side view, and FIG. 1(B) is a schematic plan.

In this image reading apparatus, an illumination lamp 92 is arranged under an original document table glass 91 on which an original document is laid. Light beams issued from the lamp 92 are reflected by reflector mirrors m1 and m2 and are gathered at an image reading position 93 on the glass 91. Light beams reflected by the document are reflected by a mirror m3 and a set of mirrors m4 and m5, and are focused by a focusing lens LN onto a linear imaging element, i.e., CCD imaging unit 94.

The lamp 92 and the mirrors m1, m2 and m3 are arranged on a first movable carriage C1. The mirrors m4 and m5 are arranged on a second movable carriage C2.

The first carriage C1 is mounted at its end c11 on a first slider S1, which is slidably fitted for reciprocation to a guide rod G1 extending in an original image subscanning direction (secondary scanning direction) X. The first carriage C1 is provided at the other end (free end) c12 with a roller R1, which can travel on a guide member G2 parallel to the guide rod G1.

The second carriage C2 is mounted at its end c21 on a second slider S2, which is slidably fitted to the guide rod G1 for reciprocation. The second carriage C2 is provided at the other end (free end) c22 with a roller R2, which can travel on the guide member G2.

Linear motors LDM1 and LDM2 are employed for driving the first and second carriages C1 and C2 as well as the first and second sliders S1 and S2,respectively, in this image reading apparatus.

The linear motor LDM1 for driving the first slider S1 and the first carriage C1 includes a flat belt-like stator 7 which has a field magnet 71 provided at its surface with N and S-poles arranged alternately in the subscanning direction X. The motor LDM1 further includes a movable piece 81 which is opposed to the field magnet 71 of the stator 7, can be reciprocated along the stator 7 and has an armature coil 811.

The armature coil 811 is held by a flat plate-like yoke 812, which is coupled to and carried by the first slider S1.

The linear motor LDM2 for driving the second slider S2 and the second carriage C2 includes the flat belt-like stator 7 which has the field magnet 71, and a movable piece 82 which is opposed to the field magnet 71 of the stator 7, can be reciprocated along the stator 7 and has an armature coil 821.

The armature coil 821 is held by a flat plate-like yoke 822, which is coupled to and carried by the second slider S2.

Figure 2:
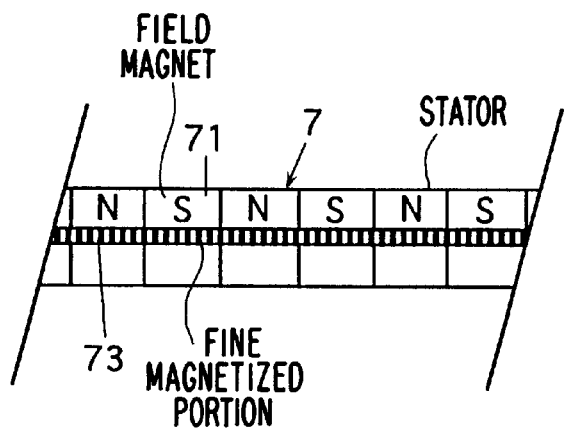
FIG. 2 is a fragmentary side view of a stator of the linear motors shown in FIG. 1(B)

In addition to the field magnet 71, the stator 7 includes a fine magnetized portion 73 for a linear encoder, which is superposed on the magnet 71, as shown in FIG. 2. The movable pieces 81 and 82 include magnetic sensors MR1 and MR2, respectively, and each of the sensors is opposed to the fine magnetized portion 73 (see FIG. 1).

The magnetic sensors MR1 and MR2 are magnetic sensors of a galvanomagnetic effect type so-called MR elements, and are provided with bias magnets, and thus have high sensitivities. In accordance with travel of the movable piece 81 and 82 along the stator 7, magnetic sensors MR1 and MR2 can detect magnetic high frequency signals from the fine magnetized portion 73 and can detect positions of the movable pieces 81 and 82 in the longitudinal direction of the stator 7, respectively.

The magnetic sensor MR1 and fine magnetized portion 73 form an encoder E1 of the motor LDM1. The encoder E1 is connected to a motor control circuit which will be described later. The magnetic sensor MR2 and fine magnetized portion 73 form an encoder E2 of the motor LDM2. The encoder E2 is connected to a motor control circuit which will be described later.

Figure 4:
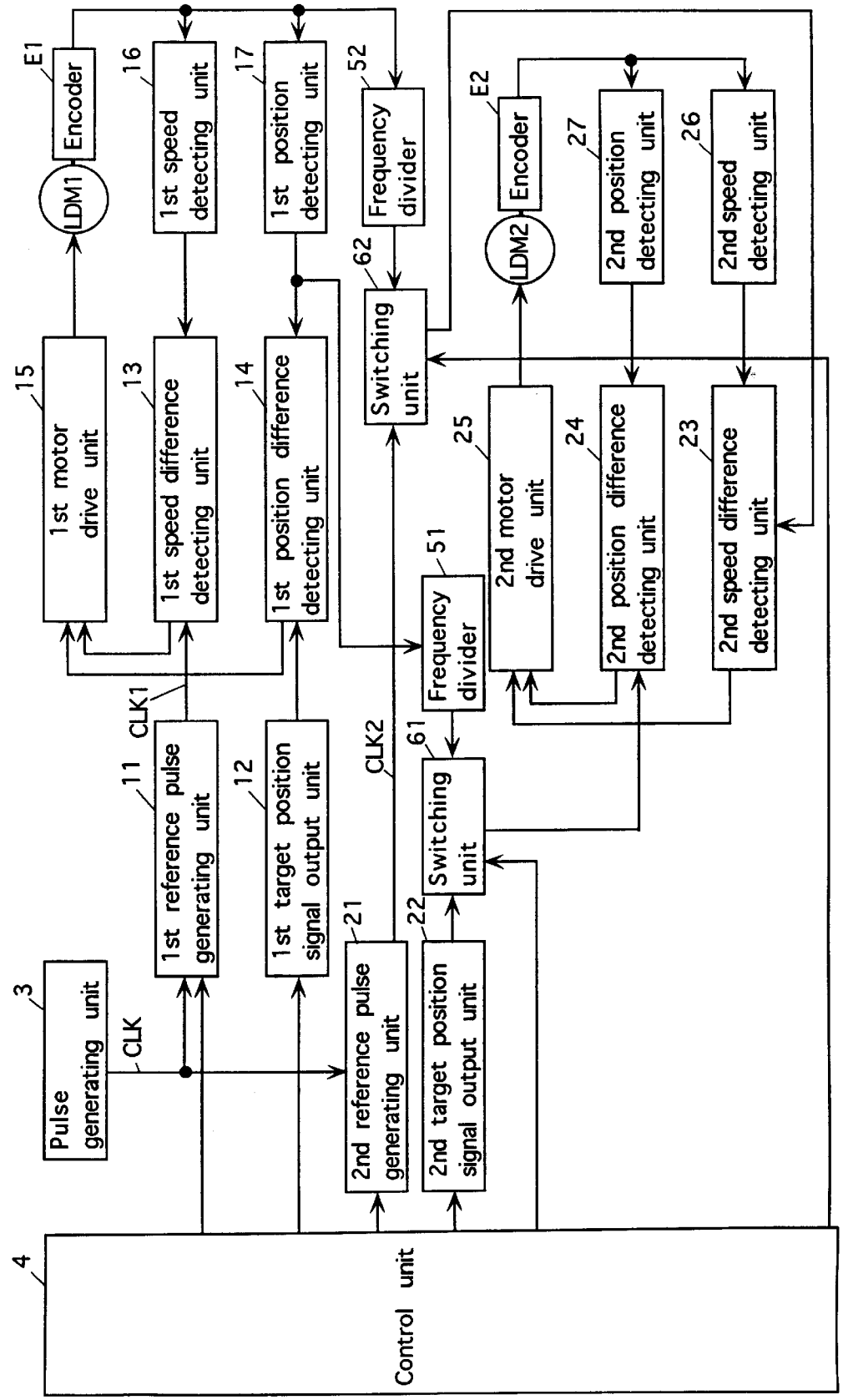
FIG. 4 is a schematic block diagram of a motor drive device of an embodiment of the invention.

According to the above structure, first and second motor drive units 15 and 25, which will be described later and are shown in FIG. 4, supply currents to the coils 811 and 821 of the movable pieces 81 and 82, so that driving forces are produced at the coils, respectively. Thereby, the movable pieces 81 and 82 move along the stator 7, and thereby drive the carriages C1 and C2 in a cantilever-like driving manner, respectively, so that the lamp 92 and others mounted thereon move in the subscanning direction X. When driven reversely, the movable pieces 81 and 82 can return to the initial positions.

Figure 3:
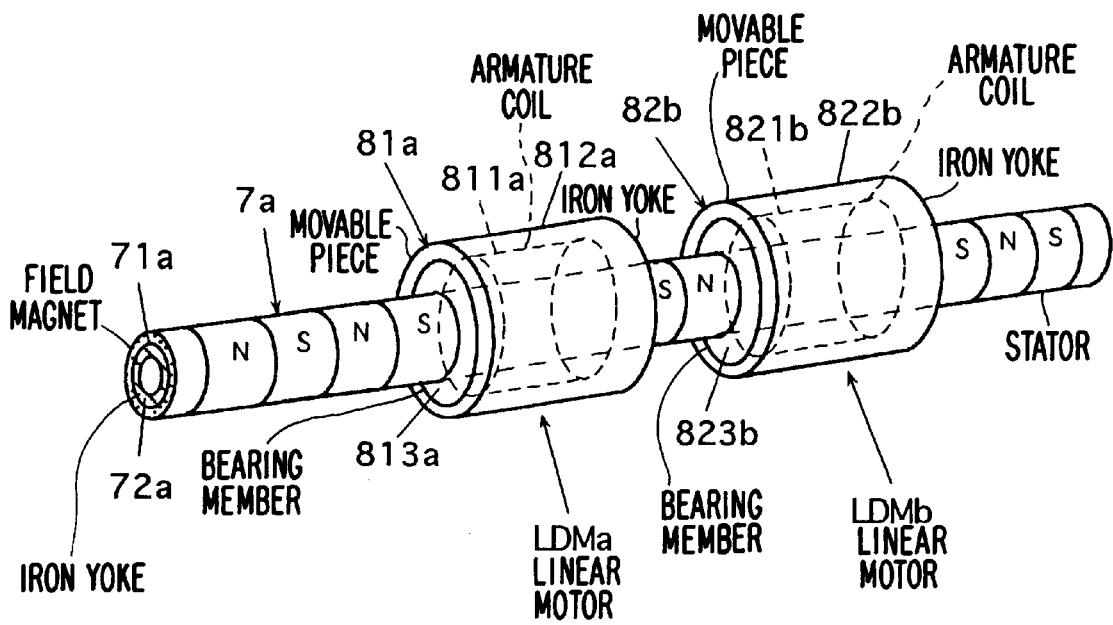
FIG. 3 is a perspective view of another example of a linear motors employed in the image reading apparatus shown in FIG. 1(B)

The linear motor LDM1 may be replaced with a shaft-type linear motor LDMa shown in FIG. 3, and the linear motor LDM2 may be replaced with a shaft-type linear motor LDMb shown in FIG. 3.

These linear motors LDMa and LDMb employ a rod-like or shaft-like stator 7a having a circular section instead of the plate-like stator 7 in the foregoing linear motors. Movable pieces 81a and 82b can travel along the stator 7a. The movable piece 81a of the motor LDMa includes an armature coil 811a and a cylindrical iron yoke 812a fitted around the armature coil 811a. The cylindrical yoke 812a is provided at its opposite ends with bearing members 813a slidably fitted around the stator 7a, and thereby the movable piece 81a can travel along the stator 7a. The movable piece 82a of the motor LDMb includes an armature coil 821b and a cylindrical iron yoke 822b fitted around the armature coil 821b. The yoke 822b is provided at its opposite ends with bearing members 823b slidably fitted around the stator 7a, and thereby the movable piece 82b can travel along the stator 7a.

The stator 7a which is commonly used in both the motors is formed of a cylindrical (or solid) iron yoke 72a provided at its outer peripheral surface with a field magnet 71a having N- and S-poles arranged alternately. This stator 7a includes a fine magnetized portion (not shown) superposed on the field magnet 71a similarly to the stator 7.

FIG. 4 shows a motor control device of an embodiment of the invention for driving and controlling the motors LDM1 and LDM2. FIG. 4 is a schematic block diagram.

This motor control device includes a pulse generating unit 3, which issues a clock pulse CLK providing a time reference, and the clock pulse CLK is supplied to a first reference pulse generating unit 11. The first reference pulse generating unit 11 divides the clock pulse CLK at a frequency dividing ratio corresponding to a target travel speed of the first carriage C1 based on a control signal corresponding to the target travel speed, coming from a control unit 4, and thereby produces a reference pulse CLK1 (target speed signal) corresponding to the target travel speed. The reference pulse CLK1 is supplied, as a target travel speed, to a first speed difference detecting unit 13.

In this embodiment, the control unit 4 includes a computer as its major component.

A first target position signal output unit 12 outputs a target position signal corresponding to the target travel position of the first carriage C1 based on an instruction from the control unit 4, and the target position signal is supplied to a first position difference detecting unit 14 as a target position.

An output signal of the encoder E1 of the motor LDM1 is supplied to a first speed detecting unit 16 and a first position detecting unit 17. The first speed detecting unit 16 detects the travel speed of the first carriage C1, and the detected travel speed is sent to the first speed difference detecting unit 13. The first position detecting unit 17 counts the number of output pulses sent from the encoder E1, and thereby detects the current position of the first carriage C1. The current position thus detected is sent to the first position difference detecting unit 14.

The first speed difference detecting unit 13 compares the reference pulse CLK1 (target speed signal) sent from the first reference pulse generating unit 11 with the travel speed signal sent from the first speed detecting unit 16, and outputs a speed difference signal corresponding to the speed difference between the target and current travel speeds. The speed difference signal is sent to a first motor drive unit 15. The first position difference detecting unit 14 compares the target position signal sent from the first target position signal output unit 12 with the current position signal of the motor LDM1 sent from the first position detecting unit 17, and issues a position difference signal corresponding to the positional difference between the target position and the current position. The positional difference thus issued is sent to the first motor drive unit 15.

The first motor drive unit 15 can supply a current, which corresponds to the speed difference and the position difference, to the armature coil 811 of the motor LDM1 based on the above speed difference signal and the position difference signal for correcting these differences.

A structure for driving the motor LDM2 will be described below.

The clock pulse CLK issued from the pulse generating unit 3 is sent to a second reference pulse generating unit 21. The second reference pulse generating unit 21 divides the clock pulse CLK at a frequency dividing ratio corresponding to a target travel speed of the second carriage C2 based on a controll signal, corresponding to the target travel speed, coming from the control unit 4, and thereby produces a reference pulse CLK2 (target speed signal) corresponding to the target travel speed. The reference pulse CLK2 is supplied to a switching unit 62.

The switching unit 62 is supplied from the frequency divider 52 with a signal produced by dividing the output signal of the encoder E1 of the motor LDM1 into ½. The switching unit 62 operates based on a control signal sent from the control unit 4. More specifically, the switching unit 62 can issue the signal prepared by dividing the output signal of the encoder E1 into ½ when the motor LDM2 is to be driven at a constant speed, and can issue the reference pulse CLK2 sent from the second reference pulse generating unit 21, when the motor LDM2 is to be driven at a changing speed (in acceleration or deceleration). The output of the switching unit 62 is sent to a second speed difference detecting unit 23.

A second target position signal output unit 22 issues a target position signal corresponding to a target travel position of the second carriage C2 based on the instruction from the control unit 4. This target position signal is supplied to a switching unit 61.

The switching unit 61 is further supplied through a frequency divider 51 with a position signal, which corresponds to ½ of the travel distance of the carriage C1 and sent from the first position detector 17 detecting the current position of the movable piece 81 (and therefore the first carriage C1) of the motor LDM1. The switching unit 61 operates based on the control signal sent from the control unit 4. More specifically, it issues a position signal corresponding to ½ of the travel distance of the movable piece 81 (carriage C1) of the motor LDM1 sent from the divider 51, when the motor LDM2 is to be driven at a constant speed, and issues the target position signal sent from the second target position signal output unit 22, when the motor LDM2 is to be driven at a changing speed. The output of the switching unit 61 is supplied to a second position difference detecting unit 24.

An output signal of the encoder E2 of the motor LDM2 is supplied to a second speed detecting unit 26 and a second position detecting unit 27. The second speed detecting unit 26 detects a travel speed of the second carriage C2, and supplies the same to the second speed difference detecting unit 23. The second position detecting unit 27 counts the number of output pulses of the encoder E2, and thereby detects the current position of the second carriage C2. The current position thus detected is supplied to the second position difference detecting unit 24.

The second speed difference detecting unit 23 compares the reference pulse CLK2 (target speed signal) sent from the switching unit 62 with the travel speed signal sent from the second speed detecting unit 26, when the motor LDM2 is to be driven at a changing speed. When the motor LDM2 is to be driven at a constant speed, the second speed difference detecting unit 23 compares the signal, which is produced by dividing into ½ the output signal of the encoder E1 sent from the switching unit 62, with the travel speed signal sent from the second speed detecting unit 26. In the case the second speed difference detecting unit 23 issues a speed difference signal corresponding to the speed difference between the target speed and the current travel speed of the movable piece 82 (carriage C2) of the motor LDM2. The speed difference signal is supplied to a second motor drive unit 25.

When the motor LDM2 is to be driven at a changing speed, the second position difference detecting unit 24 compares the target position signal sent from the switching unit 61 with the current position signal sent from the second position detecting unit 27. When the motor LDM2 is to be driven at a constant speed, the second position difference detecting unit 24 compares the position signal corresponding to ½ of the travel distance of the movable piece 81 (carriage C1) of the motor LDM1, which is sent from the switching unit 61, with the current position signal sent from the second position detecting unit 27. In either case the unit 24 issues the position difference signal corresponding to the position difference between the target position and the current position. The position difference signal is sent to the second motor drive unit 25.

The second motor drive unit 25 can operate based on the speed difference signal and the position difference signal supplied thereto, and more specifically can supply to the armature coil 821 of the motor LDM2 a current corresponding to the speed and position differences so as to correct the differences.

The target position signal output units 12 and 22, and the reference pulse generating units 11 and 21 will be described below more in detail.

The output of the first target position signal output unit 12 is a first position signal corresponding to an image reading start position (first position) of the carriage C1 when the carriage C1 is located at the initial position, i.e., home position, then changes into a second position signal corresponding to an image reading finish position (second position) of the carriage C1, and thereafter changes into a third position signal corresponding to the home position. Switching of these target position signals is performed as follows. The output signal of the first target position signal output unit 12 is the first position signal when the carriage C1 is at the initial position, i.e., home position, then is changed into the second position signal when the carriage C1 reaches the image reading position, and is changed into the third position signal when the carriage reaches the image reading finish position.

The facts that the carriage C1 reaches the image reading start position and that it reaches the image reading finish position are determined by the control unit 4 based on the current position signal supplied thereto from the first position detecting unit 17, although not shown in the figure. Based on this determination, the control unit 4 instructs the first target position signal output unit 12 to issue the above predetermined target position signal.

The first reference pulse generating unit 11 instructed by the control unit 4 operates in accordance with switching timings of the target position signal, and thereby selectively issues a first speed-change (a first acceleration) target speed signal for the travel of the carriage C1 from the home position to the first position, a constant-speed target speed signal for the travel from the first position to the second position, and a second speed-change target speed signal for the return from the second position to the home position.

The output of the second target position signal output 22 is a first position signal corresponding to the image reading start position (first position) of the carriage C2, when the carriage C2 is initially located at its home position in accordance with the instruction of the control unit 4, and then changes into the third position signal corresponding to the home position of the carriage C2. This switching of the target position signals is performed such that the first position signal is issued when the carriage C2 is initially at its home position, and the signal is switched to the third position signal when the carriage C2 reaches its image reading finish position (second position). The facts that the carriage C2 reaches the image reading start position and that it reaches image reading finish position are determined by the control unit 4 based on the current position signal of the carriage C2 supplied thereto from the second position detecting unit 27, although not shown in the figure. Based on this determination, the control unit 4 issues the instruction to output the above predetermined target position signal from the second target position signal output unit 22.

In response to the instruction from the control unit 4, the second reference pulse generating unit 21 performs switching between the speed-change target speed signals for the travel from the home position to the first position and for the second position to the home position in accordance with the timings of switching of the target position signal.

Figure 7:
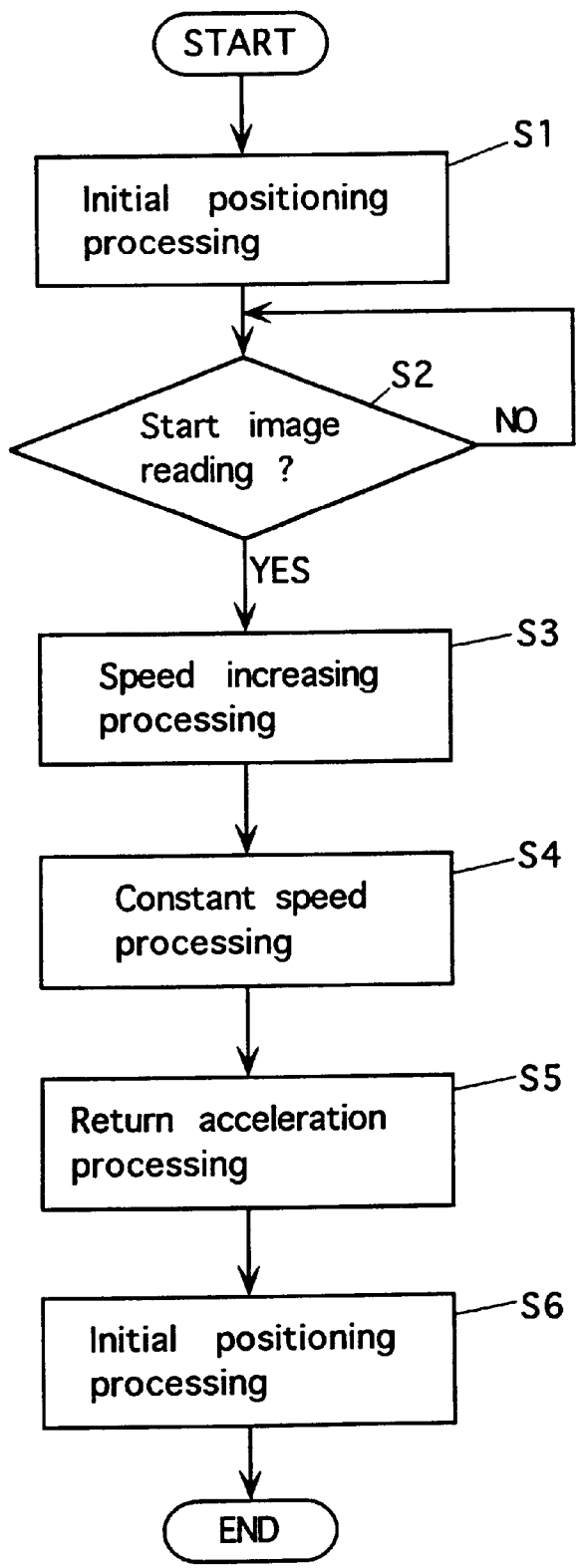
FIG. 7 is a flowchart showing processing performed by the motor control device according to the invention.
Figure 8:
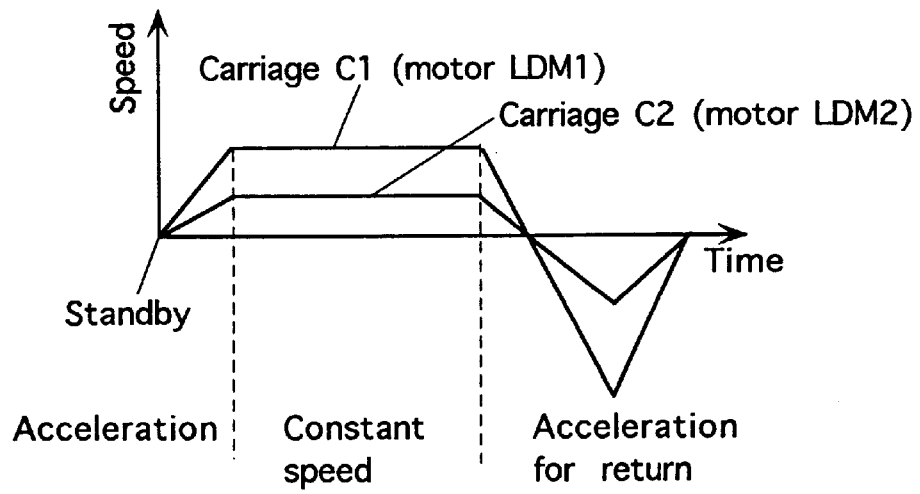
FIG. 8 shows an example of speed patterns of two carriages to be driven by the motors controlled by the motor control device according to the invention.

The motor control device described above drives the first and second carriages C1 and C2, i.e., objects to be driven in accordance with a flowchart in FIG. 7 to attain a speed pattern shown in FIG. 8. FIG. 7 is a flowchart showing processing by the motor control device. FIG. 8 shows speed patterns of the first and second carriages C1 and C2.

When the image reading apparatus provided with the first and second carriages C1 and C2 is powered on, each carriage is moved to its home position (step S1 in FIG. 7). At this time, detection of each home position is performed by home position detecting means such as a home sensor which can detect the home position of the carriage. Each carriage at corresponding home position is on standby until the image reading start signal is entered through the operation panel or the like on the image reading apparatus (step S2 in FIG. 7).

Driving of each carriage to its home position upon power-on is performed by a motor control unit (not shown) for initial setting which utilizes a part of the unit components in FIG. 4 or that other than the components in FIG. 4.

When the image reading start signal is entered, the speed increasing processing starts (steps S2 and S3 in FIG. 7).

(a) Speed Increasing Processing

In the speed increasing processing for the motor LDM1 driving the first carriage C1, the control unit 4 sends the instruction to the first reference pulse generating unit 11 to set the target speed of the motor LDM1 to the allowed maximum speed, and the first reference pulse generating unit 11 issues the clock pulse CLK1 corresponding to this maximum speed. The first target position signal output unit 12 issues the position signal corresponding to the predetermined image reading start position of the carriage C1 based on the instruction from the control unit 4.

Based on the output signal of the encoder E1, during the motor LDM1 is driven, the speed difference between the actual and target speeds as well as the position difference between the actual moving position and target position are corrected. Since the allowed maximum speed of the motor LDM1 is the target speed, the motor LDM1 is controlled to produce the maximum driving force.

The motor LDM2 driving the second carriage C2 is controlled for acceleration as follows. Similarly to the case of the motor LDM1, the second reference pulse generating unit 21 issues the clock pulse CLK2 for setting the target speed of the motor LDM2 to the allowed maximum speed based on the instruction of the control unit 4. The second target position signal output unit 22 issues the target position signal corresponding to the predetermined image reading start position of the carriage C2 based on the instruction of the control unit 4.

The outputs of the switching units 61 and 62 during the changing speed control are the output signals issued from the second target position signal output unit 22 and the second reference pulse generating unit 21. Therefore, the motor LDM2 is controlled by the control structure similar to that for the motor LDM1. Thus, the motor LDM2 is driven under the PWM (pulse width modulation) control to produce the maximum driving force similarly to the motor LDM1.

As described above, the motors LDM1 and LDM2 are individually PWM-controlled. Synchronization of these motors is ensured by the reference pulses of the motors LDM1 and LDM2 which are produced by dividing the clock pulse issued from the pulse generating unit 3 by the first and second reference pulse generating units 11 and 21. Owing to this control structure, driving at the maximum driving force can be performed easily during acceleration.

The acceleration processing described above continues until the current position detected by the first position detecting unit 17 coincides with the predetermined image reading start position. When the first and second carriages C1 and C2 reach the predetermined image reading start positions, respectively, the constant speed processing then starts (step 4 in FIG. 7).

(b) Constant Speed Processing

The motor LDM1 driving the first carriage C1 is driven at a constant speed as follows.

The first reference pulse generating unit 11 issues the reference pulse CLK1 (first target speed signal) of a constant frequency, which is produced by dividing the clock pulse CLK, i.e., input signal issued from the pulse generating unit 3, based on the control signal corresponding to the constant target speed sent from the control unit 4. The reference pulse CLK1 as well as the current travel speed of the movable piece 81 (carriage C1) of the motor LDM1, which is detected by the first speed detecting unit 16 based on the fed back signal from the encoder E1, are compared at the first speed difference detecting unit 13, and the speed difference signal issued from the unit 13 acts to correct the speed difference at the first motor driving unit 15, so that the motor LDM1 is kept at a predetermined constant target speed.

The first target position signal output unit 12 issues the target position at which the movable piece 81 (carriage C1) of the motor LDM1 must arrive. The target position is compared at the first position difference detecting unit 14 with the current position of the carriage C1 detected by the first position detecting unit 17 based on the fed back signal from the encoder E1, and the position difference signal issued from the unit 14 acts to correct the position difference (distance difference from the target position) at the first motor drive unit 15, so that the carriage C1 is driven to a predetermined target travel position.

Description will now be given on the drive control of the motor LDM2 driving the second carriage C2.

When the motor LDM2 is to be driven at a constant speed, the outputs of the switching units 61 and 62 are formed of the input signals coming from the dividers 51 and 52 based on the control signal of the control unit 4, respectively.

Thus, the second speed difference detecting unit 23 is supplied, as the target speed of the motor LDM2 (carriage C2), with the signal produced by dividing the output signal of the encoder E1 into ½ by the divider 52. Therefore, this target speed is ½ of the actual speed at which the movable piece 81 (carriage C1) of the motor LDM1 is currently moving. The target speed is compared with the current travel speed of the movable piece 82 (carriage C2) of the motor LDM2, which is detected by the second speed detecting unit 26 based on the fed back signal from the encoder E2, at the second speed difference detecting unit 23, and the speed difference signal issued from the unit 23 acts to correct the speed difference at the second motor drive unit 25, so that the motor LDM2 (carriage C2) is kept at the predetermined target speed, i.e., ½ of the actual and current travel speed of the movable piece 81 (carriage C1) of the motor LDM1. In other words, the travel speed ratio between the carriages C1 and C2 driven by the motors LDM1 and LDM2 is 2:1.

The second position difference detecting unit 24 is supplied with the target position of the movable piece 82

(carriage C2) of the motor LDM2. This target position is prepared by dividing the current position of the movable piece 81 (carriage C1) of the motor LDM1, which is detected by the first position detecting unit 17 based on the output signal of the encoder E1, into ½ by the divider 51. Therefore, this target position corresponds to half the distance which the carriage C1 has already travelled. This target position is compared by the second position difference detecting unit 24 with the current position of the movable piece 82 (carriage C2) of the motor LDM2 detected by the second position detecting unit 27. This position difference signal issued from the unit 24 acts to correct the position difference at the second motor drive unit 25, so that the carriage C2 related to the motor LDM2 is kept at the predetermined target position, i.e., the position corresponding to ½ of the actual travel distance of the carriage C1 related to the motor LDM1. In other words, the travel distance ratio between the carriages C1 and C2 of the motors LDM1 and LDM2 is kept at 2:1.

Figure 9:
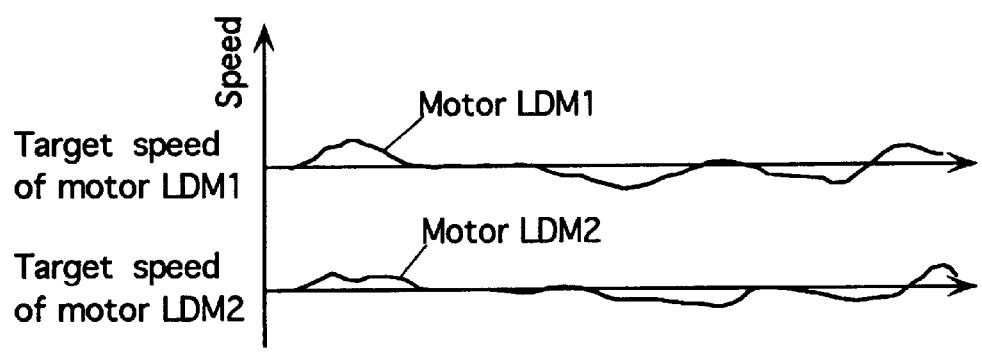
FIG. 9 shows an example of speed variations of the two motors controlled by the motor control device according to the invention.
Figure 10:
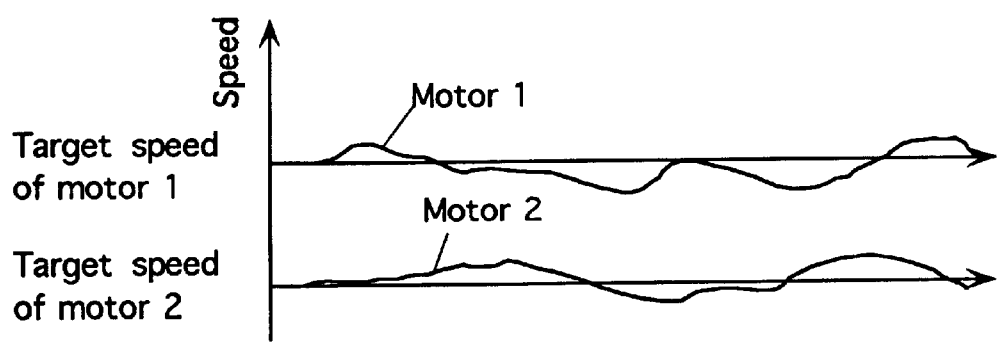
FIG. 10 shows an example of the speed variations of two motors controlled independently of each other by a conventional motor control device.

As exemplified in FIG. 9, therefore, even when variation occurs in the drive speed of the motor LDM1 (speed of the carriage C1), the drive speed of the motor LDM2 (speed of the carriage C2) varies to follow the above variation, so that the carriages C1 and C2 driven by the motors LDM1 and LDM2 can keep the actual travel speed ratio of 2:1 as well as the actual travel distance ratio of 2:1. Even if it were attempted to keep the speed ratio of 2:1 between these motors independently under PLL control, the speed ratio of 2:1 would not be kept between these motors because the speeds of the motors vary independently of each other as shown in FIG. 10.

As described above, when the motor LDM1 is to be driven at a constant speed, the motor LDM1 is controlled based on the reference pulse CLK1 issued from the first reference pulse generating unit 11. The motor LDM2 (carriage C2) is driven based on the travel speed and position of the motor LDM1 (carriage C1). Thus, each of the motors LDM1 and LDM2 is driven based on the reference pulse CLK1 issued from the first reference pulse generating unit 11.

As described above, the motor LDML can keep the travel speed of the movable piece 81 at the constant target speed, and can also keep the travel position thereof at the target position, so that the first carriage C1 can be kept at the predetermined target speed and position. The motor LDM2 can keep the travel speed of the movable piece 82 at half the actual travel speed of the movable piece 81 of the motor LDM1, and also can keep the travel distance of the movable piece 82 at half the actual travel distance of the movable piece 81 of the motor LDM1. Therefore, the actual travel speed and distance of the carriage C2 can be kept at halves of them of the first carriage C1, respectively.

As described above, when the first and second carriages C1 and C2 are driven at constant speeds, the original image is scanned by the lamp 92, mirrors and others mounted on the carriages. When reading the image, the lamp 92 and the mirrors m1, m2 and m3 move together with the first carriage C1 in the subscanning direction X, and the mirrors m4 and m5 move together with the second carriage C2 in the subscanning direction X. In this operation, the lamp 92 and the mirrors m1, m2 and m3 are moved with the speed ratio and travel distance ratio of 2:1 with respect to the mirrors m4 and m5 as described above. Therefore, the light path length from the image reading position 93 to the lens LN does not change, so that good focusing is kept, and good image reading can be performed.

The constant speed processing described above continues until the first position detecting unit 17 detects the predetermined image reading finish position of the carriage C1 as the current position. When the first and second carriages C1 and C2 reach the predetermined image reading finish positions, respectively, the return acceleration processing starts (step S5 in FIG. 7).

(c) Return Acceleration Processing

In the return acceleration processing, the motors LDM1 and LDM2 are reversely driven under PWM control to produce the maximum driving forces toward the home positions in a manner similar to the foregoing acceleration advance processing.

Similarly to the foregoing positioning processing (step S1 in FIG. 7), the first and second carriages C1 and C2 stop at their home positions for the subsequent image reading, respectively (step S6 in FIG. 7).

Figure 5:
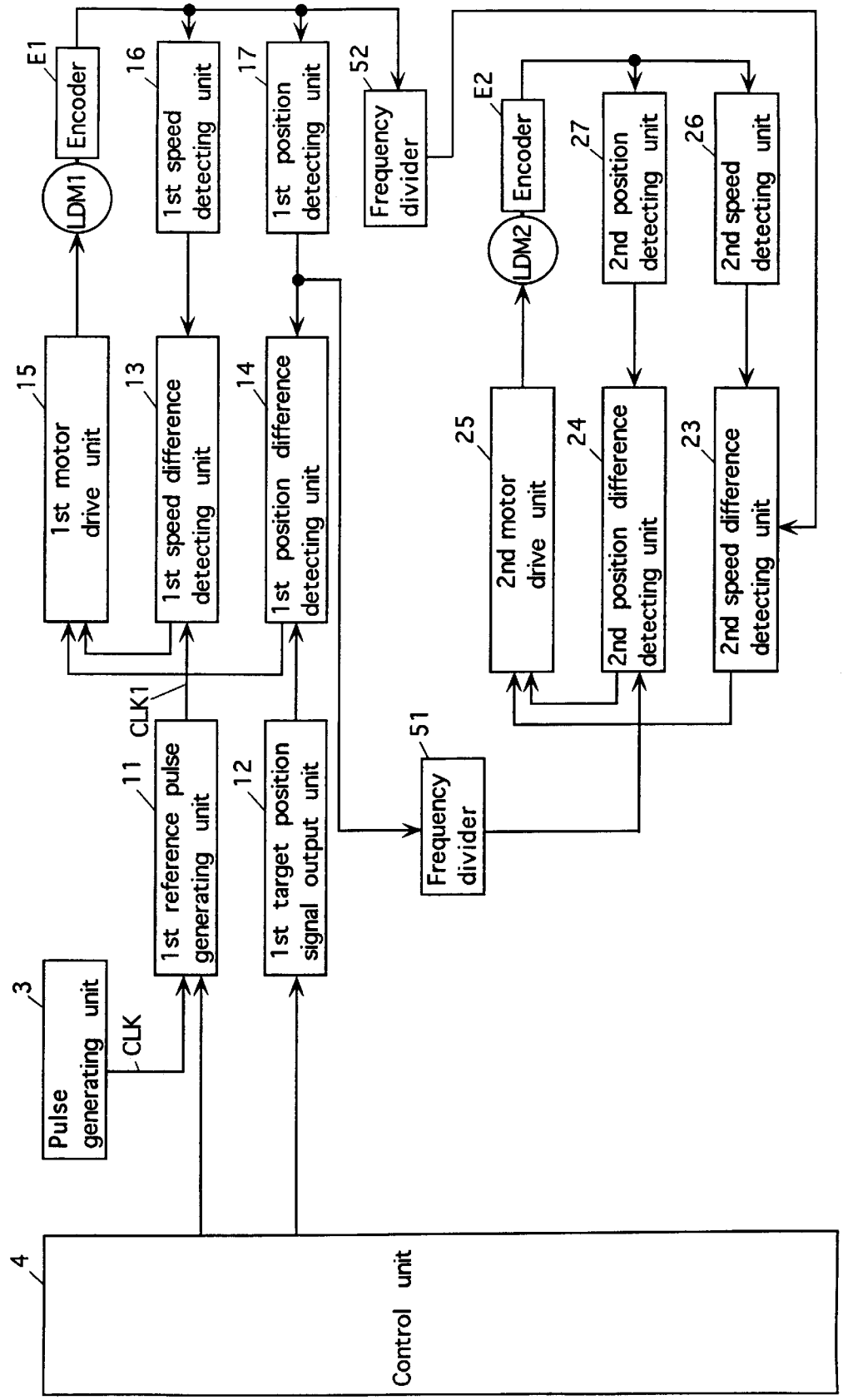
FIG. 5 is a schematic block diagram of a motor drive device of another example of the invention.

Description will now be given on a motor control device in FIG. 5, which can be used for driving the motors LDM1 and LDM2 instead of the motor control device shown in FIG. 4. FIG. 5 is a schematic block diagram of the motor control device of another embodiment of the invention.

This motor control device is designed such that both the changing speed control and constant speed control of each motor are performed by one control structure, and is substantially the same as the motor control device shown in FIG. 4 except for the target speed signal and target position signal supplied to the second speed difference detecting unit 23 and the second position difference detecting unit 24, respectively.

The second speed difference detecting unit 23 is supplied with a signal produced by dividing the output signal of the encoder E1 into ½ by the divider 52 as the target speed of the carriage C2 in either of the changing speed control and constant speed control. Therefore, this target speed is half the actual speed of the carriage C1 driven by the motor LDM1. The second position difference detecting unit 24 is supplied with the target position of the movable piece 82 (carriage C2) of the motor LDM2. This target position is prepared by dividing the current position of the movable piece 81 (carriage C1) of the motor LDM1, which is detected by the first position detecting unit 17 from the output signal of the encoder E1, into ½ by the divider 51. Therefore, this target position corresponds to half the distance which the carriage C1 driven by the motor LDM1 has already moved.

In this motor control device shown in FIG. 5, the constant speed drive control of the motors LDM1 and LDM2 are performed similarly to the motor control device shown in FIG. 4.

When the carriages C1 and C2 travel from the home positions to the image reading start positions, and when they return from the image reading finish positions to the home positions, the changing speed control (acceleration and /or deceleration speed control) is performed similarly to the constant speed control, because this motor control device performs the changing speed control by the same control block as the constant speed control.

Similarly to the control device shown in FIG. 4, this motor control device performs the constant speed control for the original image scanning in such a manner that the motor LDM1 is kept at a constant target speed, and the travel position of the movable piece 81 can be moved to the target travel position. Therefore, the first carriage C1 can be moved to the target position at the predetermined target speed. Also, the motor LDM2 can be kept at half the actual speed of the motor LDM1, and the travel distance of the movable piece 82 can be half the actual travel distance of the movable piece 81 of the motor LDM1. Therefore, the second carriage C2 can keep half the actual speed and half the actual travel distance of the first carriage C1. Thus, the first and second carriages C1 and C2 are driven with both the travel speed ratio and travel distance ratio of 2:1.

Figure 6:
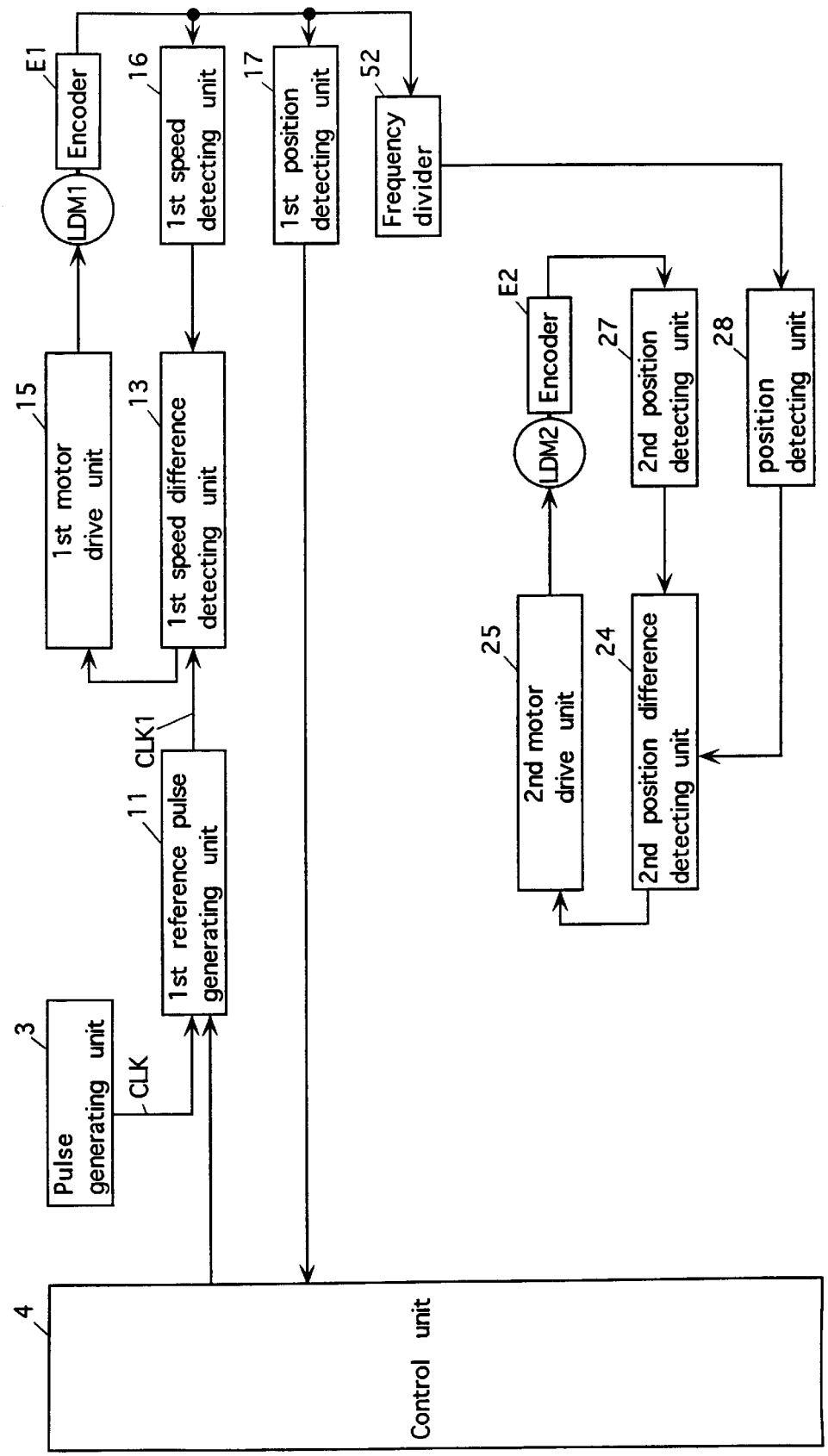
FIG. 6 is a schematic block diagram of a motor drive device of still another embodiment of the invention.

Description will now be given on a motor control device shown in FIG. 6, which can be used for drive control of the motors LDM1 and LDM2 instead of the motor control device shown in FIG. 4. FIG. 6 is a schematic block diagram of the motor control device of still another embodiment of the invention. This motor control device performs the changing speed control and constant speed control by one control structure.

This motor control device includes a pulse generating unit 3 issuing the clock pulse CLK, which forms the time reference and is supplied to a first reference pulse generating unit 11. The first reference pulse generating unit 11 operates based on a control signal corresponding to a target travel speed of the first carriage C1, which is supplied from the control unit 4 including a computer as a major component. More specifically, the first reference pulse generating unit 11 operates to divide the clock pulse CLK with a frequency division ratio corresponding to the target travel speed, and issues the reference pulse CLK1 (target speed signal) corresponding to the target travel speed. The reference pulse CLK1 is supplied to a first speed difference detecting unit 13 as a target speed.

The output signal of the encoder E1 of the motor LDM1 is supplied to a first speed detecting unit 16, which detects the speed of the motor LDM1, i.e., the travel speed of the carriage C1 and supplies the detected speed to the speed difference detecting unit 13 as the current travel speed of the carriage C1.

The first speed difference detecting unit 13 makes a comparison between the reference pulse CLK1 (target speed signal) supplied from the first reference pulse generating unit 11 and the travel speed signal supplied from the first speed detecting unit 16, and issues a speed difference signal corresponding to the speed difference between the target and travel speeds. This speed difference signal is supplied to a first motor driving unit 15.

The first motor driving unit 15 can supply a current corresponding to the speed difference to the armature coil 811 of the motor LDM1 to correct the speed difference based on the speed difference signal.

A first position detecting unit 17 detects the current position of the first carriage C1 by counting the number of output pulses of the encoder E1, and the detected current position is supplied to the control unit 4.

The first reference pulse generating unit 11 will be described below more in detail. The output thereof is successively switched between the first speed-change target speed signal for advancing the first carriage C1 from its home position to the image reading start position (first position) at an increasing speed, the constant-speed target speed signal for driving the same from the first position to the image reading finish position (second position) at a constant speed, and a second speed-change target speed signal for returning the carriage from the second position to the home position. The timings for this switching are the same as those at which the control unit 4 receiving the current position of the carriage C1 detected by the first position detecting unit 17 determines the arrival of the carriage C1 at the home position, first position and second position.

A structure for controlling and driving the motor LDM2 will be described below.

The signal, which is produced by dividing the output signal of the encoder E1 of the motor LDM1 into ½, is supplied from a divider 52 to a position detecting unit 28. The position detecting unit 28 counts the number of pulses of the received signal, and thereby supplies the position, which corresponds to ½ of the travel distance of the carriage C1 driven by the motor LDM1, as the target position to a second position difference detecting unit 24.

A second position detecting unit 27 counts the number of output pulses of the encoder E2, and thereby detects the current position of the second carriage C2. The detected current position is supplied to the second position difference detecting unit 24.

The second position difference detecting unit 24 makes a comparison between the target position signal corresponding to ½ of the travel distance of the carriage C1 and the current position signal of the carriage C2 driven by the motor LDM2, and thereby issues the position difference signal corresponding to the position difference between the target position and the current position. The position difference signal is supplied to a second motor drive unit 25.

The second motor drive unit 25 can supply a current to the armature coil 821 of the motor LDM2 to correct the position difference based on the position difference signal.

Therefore, the motors LDM1 and LDM2 are controlled by this motor control device as follows. The motor LDM1 is controlled to keep the target speed, so that the first carriage C1 can be kept at the predetermined target speed. The motor LDM2 can keep the travel position of the movable piece 82 at the position corresponding to 1/2 of the actual travel distance of the movable piece 81, so that the travel distance of the second carriage C2 can be kept at ½ of the actual travel distance of the first carriage C1. Thus, the first and second carriages C1 and C2 can precisely keep the travel distance ratio of 2:1.

In this motor control device, the reference pulse CLK issued from the reference pulse generating unit 11 forms the reference for controlling the motors LDM1 and LDM2. Even when a variation occurs at the speed of the motor LDM1 (carriage C1), the motor LDM2 (carriage C2) is controlled to follow the position variation corresponding to the speed variation of the motor LDM1 (carriage C1), so that the travel distance ratio of 2:1 is kept between the first and second carriages C1 and C2 as described above. The fact that the travel distance ratio of 2:1 is kept means that the speed ratio between the motors LDM1 and LDM2 (carriages C1 and C2) is substantially kept at 2:1.

The carriages (first and second carriages C1 and C2) arranged at the image reading apparatus can keep a constant light path length from the original surface to the focusing lens LN only by keeping the travel distance ratio of 2:1 during image reading. Therefore, the motor control device shown in FIG. 6 can control the motors LDM1 and LDM2 to keep the travel distance ratio of 2:1 with a simpler structure than the motor control devices shown in FIGS. 4 and 5.

This motor control device performs the changing speed control and constant speed control similarly to the control device shown in FIG. 5.

Similarly to the control device shown in FIG. 4, PWM control for the changing speed control may be employed to allow easy drive and control with the maximum drive force, and the control structure shown in FIG. 6 may be employed for the constant speed control of the motors.

In the motor control devices shown in FIGS. 4 to 6 described above, magnetic encoders are employed as the encoders E1 and E2 of the motors LDM1 and LDM2, optical encoders may be employed. The encoders E1 and E2 which are of an increment type in the embodiments may be replaced with those of an absolute type, and the control device may be provided with position detecting means and speed detecting means corresponding to the encoders of the absolute type, whereby the motors can be controlled similarly to the foregoing operations.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A motor control device for controlling operations of a plurality of motors provided for a plurality of driven objects for driving the driven objects, respectively, comprising:

means for outputting a target speed signal corresponding to a target travel speed of a driven object driven by one of said plurality of motors;

means for performing feedback control of the operation of said one motor to attain the target travel speed of the driven object driven by said one motor based on the target speed signal issued from said target speed signal output means;

means for outputting a target speed signal corresponding to an intended target travel speed of an other driven object driven by a motor other than said one motor based on a current travel speed of the driven object driven by said one motor with respect to said above current travel speed; and means for performing feedback control of the operation of said other motor for said other driven object to attain the target travel speed of said other driven object based on the target speed signal sent from said target speed signal output means corresponding to said other driven object, wherein each of said driven objects is to be driven such that it advances from a home position to a first position at an increasing speed, advances from the first position to a second position at a constant speed, and then returns to the home position, said motor control device further comprises switching means for switching the target speed signal outputted from the target speed signal output means for the driven object driven by said one motor between a first speed-change target speed signal for advancing and accelerating the driven object from the home position to the first position, a constant-speed target speed signal for constant speed advance from the first position to the second position, and a second speed-change target speed signal for return from the second position to the home position, and each of said motors is controlled to drive the corresponding driven object selectively at changing and constant speed selected by this switching means.

2. The motor control device according to claim 1, wherein each of said driven objects is a slider.

3. A motor control device for controlling operations of a plurality of motors provided for a plurality of driven objects for driving the driven objects, respectively, comprising:

means for outputting a target speed signal corresponding to a target travel speed of a driven object driven by one of said plurality of motors;

means for outputting a target position signal corresponding to a target travel position of the driven object driven by said one motor;

means for performing feedback control of the operation of said one motor to attain the target travel speed and the target travel position of the driven object driven by said one motor based on the target speed signal issued from said target speed signal output means and the target position signal issued from said target position signal output means;

means for outputting a target speed signal corresponding to an intended target travel speed of an other driven object driven by a motor other than said one motor based on a current travel speed of the driven object driven by said one motor with respect to said above current travel speed;

means for outputting a target position signal corresponding to an intended target travel position of the other driven object driven by the motor other than said one motor based on a current position of the driven object driven by said one motor with respect to said above current position; and means for performing feedback control of the operation of said other motor for said other driven object to attain the target travel speed and the target travel position of said other driven object based on the target speed signal issued from said target speed signal output means corresponding to said other driven object and said target position signal issued from said target position signal output means corresponding to said other driven object, switching means for successively switching the target position signal outputted from the target position signal output means for the driven object driven by said one motor between position signals for the first position, the second position and the home position, and switching means for switching the target speed signal outputted from the target speed signal output means for the driven object driven by said one motor between a first speed-change target speed signal for advancing and accelerating the driven object from the home position to the first position, a constant-speed target speed signal for constant speed advance from the first position to the second position, and a second speed-change target speed signal for return from the second position to the home position, wherein each of the motors is controlled to drive the corresponding driven object selectively at changing and constant speed selected by this switching means.

4. The motor control device according to claim 3, wherein each of said driven objects is a slider.

5. A motor control device for controlling operations of first and second motors provided with encoders and operable to drive first and second driven objects, respectively, comprising:

first speed detecting means for detecting a travel speed of said first driven object based on an encoder output signal of said first motor, and issuing a current travel speed signal;

first position detecting means for detecting a current position of said first driven object based on an encoder output signal of said first motor, and issuing a current travel position signal;

first target speed signal output means for outputting a target speed signal corresponding to a target travel speed of said first driven object;

first target position signal output means for outputting a target position signal corresponding to a target travel position of said first driven object;

first speed difference detecting means for making a comparison between the target speed signal issued from said first target speed signal output means and the travel speed signal issued from said first speed detecting means, and outputting a speed difference signal corresponding to the difference detected by the comparison;

first position difference detecting means for making a comparison between the target position signal issued from said first target position signal output means and the current position signal issued from said first position detecting means, and outputting a position difference signal corresponding to the position difference detected by the comparison;

first motor drive means for driving said first motor so as to correct said speed difference and said position difference based on the speed difference signal sent from said first speed difference detecting means and the position difference signal sent from said first position difference detecting means;

second speed detecting means for detecting a travel speed of said second driven object based on an encoder output signal of said second motor, and outputting a current travel speed signal;

second position detecting means for detecting a current position of said second driven object based on an encoder output signal of said second motor, and outputting a current position signal;

second target speed signal output means for outputting a target speed signal corresponding to a target travel speed of said second driven object corresponding to a predetermined drive speed ratio between said first and second driven objects based on the encoder output signal of said first motor;

second target position signal output means for outputting a target position signal corresponding to a target travel position of said second driven object corresponding to a predetermined travel distance ratio between said first and second driven objects based on the current position signal of said first driven object sent from said first position detecting means;

second speed difference detecting means for making a comparison between the target speed signal issued from said second target speed signal output means and the travel speed signal issued from said second speed detecting means, and outputting a speed difference signal corresponding to the speed difference detected by the comparison;

second position difference detecting means for making a comparison between the target position signal issued from said second target position signal output means and said current position signal issued from said second position detecting means, and outputting a position difference signal corresponding to the position difference detected by the comparison; and second motor drive means for driving said second motor so as to correct the speed difference and the position difference based on the speed difference signal sent from said second speed difference detecting means and the position difference signal sent from said second position difference detecting means, wherein said first and second driven objects are driven to advance from a home position to a first position at an increasing speed, advance from the first position to a second position at a constant speed, and subsequently return to the home position;

said first target speed signal output means is operable to output a constant-speed target speed signal corresponding to a constant target travel speed of said first driven object when the first driven object moved from the home position reaches the first position;

said first target position signal output means is operable to output the target position signal corresponding to said second position when said first driven object moved from said home position reaches said first position; and said motor control device further includes means for controlling operations of said first and second motors such that said first and second driven objects advance from their home positions to the first positions at an increasing speed, and return from the second positions to the home positions.

6. A motor control device for controlling operations of first and second motors provided with encoders and operable to drive first and second driven objects, respectively, comprising:

first speed detecting means for detecting a travel speed of said first driven object based on an encoder output signal of said first motor, and issuing a current travel speed signal;

first position detecting means for detecting a current position of said first driven object based on an encoder output signal of said first motor, and issuing a current travel position signal;

first target speed signal output means for outputting a target speed signal corresponding to a target travel speed of said first driven object;

first target position signal output means for outputting a target position signal corresponding to a target travel position of said first driven object;

first speed difference detecting means for making a comparison between the target speed signal issued from said first target speed signal output means and the travel speed signal issued from said first speed detecting means, and outputting a speed difference signal corresponding to the difference detected by the comparison;

first position difference detecting means for making a comparison between the target position signal issued from said first target position signal output means and the current position signal issued from said first position detecting means, and outputting a position difference signal corresponding to the position difference detected by the comparison;

first motor drive means for driving said first motor so as to correct said speed difference and said position difference based on the speed difference signal sent from said first speed difference detecting means and the position difference signal sent from said first position difference detecting means;

second speed detecting means for detecting a travel speed of said second driven object based on an encoder output signal of said second motor, and outputting a current travel speed signal;

second position detecting means for detecting a current position of said second driven object based on an encoder output signal of said second motor, and outputting a current position signal;

second target speed signal output means for outputting a target speed signal corresponding to a target travel speed of said second driven object corresponding to a predetermined drive speed ratio between said first and second driven objects based on the encoder output signal of said first motor;

second target position signal output means for outputting a target position signal corresponding to a target travel position of said second driven object corresponding to a predetermined travel distance ratio between said first and second driven objects based on the current position signal of said first driven object sent from said first position detecting means;

second speed difference detecting means for making a comparison between the target speed signal issued from said second target speed signal output means and the travel speed signal issued from said second speed detecting means, and outputting a speed difference signal corresponding to the speed difference detected by the comparison;

second position difference detecting means for making a comparison between the target position signal issued from said second target position signal output means and said current position signal issued from said second position detecting means, and outputting a position difference signal corresponding to the position difference detected by the comparison; and second motor drive means for driving said second motor so as to correct the speed difference and the position difference based on the speed difference signal sent from said second speed difference detecting means and the position difference signal sent from said second position difference detecting means, wherein said first and second driven objects are driven to advance from a home position to a first position at an increasing speed, advance from the first position to a second position at a constant speed, and subsequently return to the home position;

said motor control device further includes means for successively switching the target position signal issued from the target position signal output means provided for the first driven object driven by said first motor between position signals indicating the first position, the second position and the home position;

said motor control device further includes means for switching the target speed signal issued from the target speed signal output means provided for the first driven object driven by said first motor between a first speed-change target speed signal for advance at an increasing speed from said home position to said first position, a constant-speed target speed signal for advance at a constant speed from said first position to said second position, and a second speed-change target speed signal for return from said second position to the home position; and each of said motors is controlled to drive the corresponding driven object selectively at variable and constant speeds in accordance with switching of the target speed signal.

7. The motor control device according to claim 6, wherein said first and second driven objects are a slider.

8. The motor control device according to claim 6, wherein said first driven object is a first slider carrying a light source for radiating an original document surface with light beams and a first reflector member for reflecting the light beams coming from the original document, and said second driven object is a second slider carrying a second reflector member for focusing the light beams coming from said first reflector member on a focusing portion.

9. The motor control device according to claim 5, wherein said first and second driven objects are sliders.

10. The motor control device according to claim 5, wherein said first driven object is a first slider carrying a light source for radiating an original document surface with light beams and a first reflector member for reflecting the light beams coming from the original document, and said second driven object is a second slider carrying a second reflector member for focusing the light beams coming from said first reflector member on a focusing portion.

11. A motor control device for controlling operations of a plurality of motors provided for a plurality of driven objects for driving the driven objects, respectively, comprising:

means for outputting a target speed signal corresponding to a target travel speed of a driven object driven by one of said plurality of motors;

means for performing feedback control of the operation of said one motor to attain the target travel speed of the driven object driven by said one motor based on the target speed signal issued from said target speed signal output;

means for outputting a target position signal corresponding to an intended target travel position of the driven object driven by an other motor other than said one motor based on a current position of the driven object driven by said one motor with respect to said above current position; and means for performing feedback control of the operation of said other motor for said other driven object to attain the target travel position of said other driven object based on the target position signal sent from said target position signal output means corresponding to said other driven object, wherein each of said driven objects is to be driven such that it advances from a home position to a first position at an increasing speed, advances from the first position to a second position at a constant speed, and then returns to the home position, said motor control device further comprises switching means for switching the target speed signal outputted from the target speed signal output means for the driven object driven by said one motor between a first speed-change target speed signal for advancing and accelerating the driven object from the home position to the first position, a constant-speed target speed signal for constant speed advance from the first position to the second position, and a second speed-change target speed signal for return from the second position to the home position, and each of the motors is controlled to drive the corresponding driven object selectively at changing and constant speed selected by this switching means.

12. The motor control device according to claim 11, wherein each of said driven objects is a slider.

* * * * *